United States Patent
Ma et al.

(10) Patent No.: US 11,322,739 B2
(45) Date of Patent: May 3, 2022

(54) SECONDARY BATTERY, METHOD FOR MANUFACTURING THE SAME, AND APPARATUS CONTAINING THE SAME

(71) Applicant: Contemporary Amperex Technology Co., Limited, Ningde (CN)

(72) Inventors: Jianjun Ma, Ningde (CN); Rui Shen, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/513,937

(22) Filed: Oct. 29, 2021

(65) Prior Publication Data

US 2022/0052321 A1 Feb. 17, 2022

Related U.S. Application Data

(63) Continuation of application No. PCT/CN2020/088443, filed on Apr. 30, 2020.

(51) Int. Cl.
*H01M 4/133* (2010.01)
*H01M 4/36* (2006.01)
(Continued)

(52) U.S. Cl.
CPC ......... *H01M 4/364* (2013.01); *H01M 4/0404* (2013.01); *H01M 4/133* (2013.01);
(Continued)

(58) Field of Classification Search
CPC .. H01M 4/364; H01M 4/0404; H01M 4/1315; H01M 4/133; H01M 4/366;
(Continued)

(56) References Cited

U.S. PATENT DOCUMENTS

2007/0248884 A1* 10/2007 Tsuchiya ........... H01M 10/0525
429/231.4
2019/0305308 A1 10/2019 Lee et al.

FOREIGN PATENT DOCUMENTS

CN 101047235 A 10/2007
CN 102931381 A 2/2013
(Continued)

OTHER PUBLICATIONS

The International search report for PCT Application No. PCT/CN2020/088443, dated Jan. 27, 2021, 17 pages.
(Continued)

*Primary Examiner* — Cynthia K Walls
(74) *Attorney, Agent, or Firm* — Law Offices of Liaoteng Wang

(57) ABSTRACT

The present application relates to a secondary battery, a method for manufacturing the same and an apparatus containing the same. Specifically, in the secondary battery, the first negative electrode film comprises a first negative electrode active material, the second negative electrode film comprises a second negative electrode active material. The first negative electrode active material comprises natural graphite and satisfies: 12%≤A≤18%; the second negative electrode active material comprises artificial graphite and satisfies: 20%≤B≤30%; A is a resilience rate of the first negative electrode active material measured under an action force of 15,000 N, and B is a resilience rate of the second negative electrode active material measured under an action force of 15,000 N. The secondary battery of the present application can have better kinetic performance and better high-temperature storage performance while maintaining higher energy density.

12 Claims, 3 Drawing Sheets

(51) Int. Cl.
*H01M 4/1315* (2010.01)
*H01M 4/587* (2010.01)
*H01M 10/052* (2010.01)
*H01M 4/04* (2006.01)
*H01M 4/525* (2010.01)
*H01M 4/02* (2006.01)

(52) U.S. Cl.
CPC ......... *H01M 4/1315* (2013.01); *H01M 4/366* (2013.01); *H01M 4/525* (2013.01); *H01M 4/587* (2013.01); *H01M 10/052* (2013.01); H01M 2004/021 (2013.01)

(58) Field of Classification Search
CPC .... H01M 4/525; H01M 4/587; H01M 10/052; H01M 2004/021
See application file for complete search history.

(56) References Cited

FOREIGN PATENT DOCUMENTS

| | | |
|---|---|---|
| CN | 109704324 A | 5/2019 |
| CN | 110346728 A | 10/2019 |
| JP | 2003346788 A | 12/2003 |
| JP | 2016105349 A | 6/2016 |
| WO | 2020071814 A1 | 4/2020 |

OTHER PUBLICATIONS

The extended European search report for EP Application No. 20923679.3, dated Mar. 21, 2022, 9 pages.

* cited by examiner

SECONDARY BATTERY, METHOD FOR MANUFACTURING THE SAME, AND APPARATUS CONTAINING THE SAME

CROSS-REFERENCES TO RELATED APPLICATIONS

This application is a continuation of International application No. PCT/CN2020/088443, filed on Apr. 30, 2020, which is hereby incorporated by reference in its entirety.

TECHNICAL FIELD

The present application belongs to the field of electrochemical technology, and more specifically, relates to a secondary battery, a method for manufacturing the same and an apparatus containing the same.

BACKGROUND

The secondary battery is widely used in various consumer electronic products and electric vehicles due to its prominent features such as light weight, no pollution and no memory effect.

With the development of new energy industry, people put forward higher requirements for the use of secondary batteries. It is still a key challenge in the field of secondary battery how to make the secondary battery have other good electrochemical performances while maintaining higher energy density.

In view of the above, it is necessary to provide a secondary battery with several different performances all being good so as to meet different needs from users.

SUMMARY

In view of the technical problems in the background technology, the present application provides a secondary battery and an apparatus containing the same, aiming at making the secondary battery have better kinetic performance and better high-temperature storage performance while maintain higher energy density.

In order to achieve the above object, in a first aspect of the present application, there is provided a secondary battery, the secondary battery comprises a negative electrode plate, the negative electrode plate comprises a negative electrode current collector and a negative electrode film, the negative electrode film comprises a first negative electrode film and a second negative electrode film; the first negative electrode film is disposed on at least one surface of the negative electrode current collector and comprises a first negative electrode active material, the second negative electrode film is disposed on the first negative electrode film and comprises a second negative electrode active material. The first negative electrode active material comprises natural graphite and satisfies: $12\% \le A \le 18\%$, the second negative electrode active material comprises artificial graphite and satisfies: $20\% \le B \le 30\%$, A is a resilience rate of the first negative electrode active material measured under an action force of 15,000 N, and B is a resilience rate of the second negative electrode active material measured under an action force of 15,000 N.

In a second aspect of the present application, there is provided a method for manufacturing a secondary battery, comprising the following steps to prepare the negative electrode plate of the secondary battery:

1) forming, on at least one surface of the negative electrode current collector, a first negative electrode film that comprises a first negative electrode active material, the first negative electrode active material comprises natural graphite and satisfies: $12\% \le A \le 18\%$;

2) forming, on the first negative electrode film, a second negative electrode film that comprises a second negative electrode active material, the second negative electrode active material comprises artificial graphite and satisfies: $20\% \le B \le 30\%$;

A is a resilience rate of the first negative electrode active material measured under an action force of 15,000 N, and B is a resilience rate of the second negative electrode active material measured under an action force of 15,000 N.

In a third aspect of the present application, there is provided an apparatus, which comprises the secondary battery according to the first aspect of the present application or the secondary battery that is manufactured by the method according to the second aspect of the present application.

Compared with existing technologies, the present application includes at least the following beneficial effects:

For the secondary battery of the present application, the negative electrode plate comprises the first negative electrode film and the second negative electrode film, and specific negative electrode active material is selected in each negative electrode film, through the reasonable design of the upper film and the lower film, the secondary battery of the present application can have better kinetic performance and better high-temperature storage performance while maintaining higher energy density. The apparatus of the present application comprises the secondary battery and thus has at least the same advantages as the secondary battery.

Figure 1:
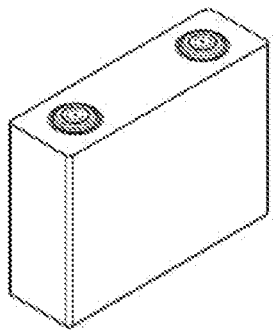
FIG. 1 is a schematic diagram of a secondary battery provided by an embodiment of the present application.

In the drawings, the designation of the reference signs is as follows:
1 Battery pack
2 Upper case body
3 Lower case body
4 Battery module
5 Secondary battery
51 Case
52 Electrode assembly
53 Cover plate
10 Negative electrode plate
101 Negative electrode current collector
102 Second negative electrode film
103 First negative electrode film

DETAILED DESCRIPTION

The present application is further described with reference to the embodiments. It should be understood that these embodiments are only for illustrating the present application, and are not intended to limit the scope of the present application.

For the sake of brevity, only certain numerical ranges are explicitly disclosed herein. However, any lower limit may be combined with any upper limit to form a range that is not explicitly described; and any lower limit may be combined with any other lower limit to form a range that is not explicitly described, and any upper limit may be combined with any other upper limit to form a range that is not explicitly described. Further, each individually disclosed point or single value may be a lower or upper limit and combined with any other point or single value or combined with other lower or upper limits to form a range that is not explicitly described.

In the description herein, it should be noted that, unless otherwise stated, the recitation of numerical ranges by "no less than" and "no more than" include all numbers within that range including the endpoints, the recitation of "more" in the phrase "one or more" includes two or more.

Unless otherwise stated, the terms used in the present application have the meaning well-known by a person of ordinary skill in the art. Unless otherwise stated, the values of the parameters disclosed in the present application may be measured by various methods commonly used in the art (for example, may be measured according to the method illustrated in the embodiments of the present application).

Secondary Battery

In a first aspect of the present application, there is provided a secondary battery. The secondary battery comprises a positive electrode plate, a negative electrode plate and an electrolyte. During charging and discharging process of the battery, active ions are intercalated into and deintercalated from the positive electrode plate and the negative electrode plate therebetween back and forth. The electrolyte conducts active ions between the positive electrode plate and the negative electrode plate.

[Negative Electrode Plate]

In the secondary battery of the present application, the negative electrode plate comprises a negative electrode current collector and a negative electrode film, the negative electrode film comprises a first negative electrode film and a second negative electrode film. The first negative electrode film is disposed on at least one surface of the negative electrode current collector and comprises a first negative electrode active material, the second negative electrode film is disposed on the first negative electrode film and comprises a second negative electrode active material. The first negative electrode active material comprises natural graphite and satisfies: $12\% \leq A \leq 18\%$, the second negative electrode active material comprises artificial graphite and satisfies: $20\% \leq B \leq 30\%$, A is a resilience rate of the first negative electrode active material measured under an action force of 15,000 N and B is a resilience rate of the second negative electrode active material measured under an action force of 15,000 N.

When the first negative electrode active material comprises natural graphite, the second negative electrode active material comprises artificial graphite, and the resilience rate of the first negative electrode active material and the resilience rate of the second negative electrode active material respectively fall within a certain range, the secondary battery can have better kinetic performance and better high-temperature storage performance while maintaining higher energy density.

Through a plurality of study, the inventors have found that, when the resilience rate of the first negative electrode active material and the resilience rate of the second negative electrode active material both fall within the given ranges, the liquid-phase diffusion path between the upper film and the lower film of the negative electrode film can be optimally matched, the conduction rate of the active ions can be effectively improved, and therefore the kinetic performance of the battery can be improved; meanwhile, the specific design on the resilience rate of the materials respectively in the upper film and the lower film can make the active sites in the negative electrode film be reasonably optimized, side reactions occurred in the battery during the deintercalation and intercalation process of the active ions can be effectively decreased, and therefore, the high-temperature storage performance of the battery can be effectively improved.

In some preferred embodiments, the first negative electrode active material satisfies: $13\% \leq A \leq 16\%$.

In some preferred embodiments, the second negative electrode active material satisfies: $24\% \leq B \leq 28\%$.

Through further study, the inventors have found that, the performances of the battery can be further improved when the negative electrode plate of the present application satisfies one or more of the following parameters and based on the aforementioned design.

In some preferred embodiments, $1.1 \leq B/A \leq 2.5$; and more preferably, $1.5 \leq B/A \leq 2.1$.

When the value of B/A is controlled to fall within the given range, the negative electrode active materials respectively in the upper film and the lower film can be better matched, the active ions deintercalated from the positive electrode can intercalate more quickly and orderly into the negative electrode active material particles, which can reduce the risk of lithium precipitation during the cycle process of the battery and reduce the polarization so as to further improve the kinetic performance and the storage performance of the battery.

In some preferred embodiments, the first negative electrode active material has a particle size distribution (Dv90–Dv10)/Dv50 of less than the second negative electrode active material.

When the first negative electrode active material has a particle size distribution of less than the second negative electrode active material, the fine powder content in the first negative electrode active material is lower, which is beneficial to reducing the side reactions; at the same time, the difference between the particle sizes of the particles are smaller due to the smaller particle size distribution of the material, the diffusion rates of the active ions in different particles are close to each other, the stresses produced during the deintercalation and intercalation process of the active ions are also close to each other, which is beneficial to decreasing the expansion of the electrode plate so as to further improve the cycle performance of the battery. Meanwhile, the content of the particles with a small particle size in the second negative electrode active material is relatively high, which is beneficial to decreasing the diffusion path of the active ions and is favor of the fast diffusion of the active ions in the electrode plate, and therefore, the kinetic performance of the battery is further improved. In addition, the combination design of the bigger particle size distribution and the smaller particle size distribution respectively in the upper film and the lower film is beneficial to increasing the pressed density of the negative electrode film, and therefore, the energy density of the battery is further improved.

In some preferred embodiments, the first negative electrode active material has a volume average particle size Dv50 of greater than the second negative electrode active material.

The volume average particle size Dv50 of the first negative electrode active material is greater than the volume average particle size Dv50 of the second negative electrode active material, which is beneficial to decreasing the difference between the capacity of the active material in the upper film and the capacity of the active material in the lower film, and also decreasing the cold-pressing action force acted on the upper film and decreasing the risk of lithium precipitation during the cycle process of the battery, and therefore, the cycle performance of the battery can be further improved.

In some preferred embodiments, the first negative electrode active material has a volume average particle size Dv10 of from 8 μm to 12 μm, and more preferably from 9 μm to 11 μm.

In some preferred embodiments, the second negative electrode active material has a volume average particle size Dv10 of from 6 μm to 10 μm, and more preferably from 7 μm to 9 μm.

In some preferred embodiments, the first negative electrode active material has a volume average particle size Dv50 of from 15 μm to 19 μm, and more preferably from 16 μm to 18 μm.

In some preferred embodiments, the second negative electrode active material has a volume average particle size Dv50 of from 14 μm to 18 μm, and more preferably from 15 μm to 17 μm.

In some preferred embodiments, the first negative electrode active material may have a particle size distribution of $1.0 \leq (Dv90-Dv10)/Dv50 \leq 1.5$, and more preferably, $1.0 \leq (Dv90-Dv10)/Dv50 \leq 1.3$.

In some preferred embodiments, the second negative electrode active material may have a particle size distribution of $1.0 \leq (Dv90-Dv10)/Dv50 \leq 2$, and more preferably, $1.2 \leq (Dv90-Dv10)/Dv50 \leq 1.7$.

In some preferred embodiments, the first negative electrode active material has a graphitization degree of from 95% to 98%, and more preferably from 96% to 97%.

In some preferred embodiments, the second negative electrode active material has a graphitization degree of from 90% to 95%, and more preferably from 91% to 93%.

When the first negative electrode active material and/or the second negative electrode active material, moreover, have a graphitization degree falling within the given ranges, the crystal structures of the graphite respectively in the upper film and the lower film are more reasonably matched, which effectively improves the solid-phase diffusion rate of the active ions during the charging and discharging cycle process and reduces the side reactions occurred during the charging and discharging cycle process of the battery, thereby further improving the kinetic performance and the cycle performance of the battery.

In some preferred embodiments, a morphology of the first negative electrode active material may comprise one or more of sphere and spheroid. At this time, the electrochemical expansion of the battery can be effectively suppressed and the processing performance of the negative electrode plate can be effectively improved.

In some preferred embodiments, a morphology of the second negative electrode active material may comprise one or more of block and flake. At this time, the gaps among the particles of the material can be effectively improved, bridging effect is easily produced among the particles that are in a shape of block and flake, which is in favor of the electrolyte infiltration and the transmission of the active ions so as to further improve the kinetic performance of the battery.

In some preferred embodiments, an amorphous carbon coating layer is presented on at least part of surface of the first negative electrode active material.

In some preferred embodiments, no amorphous carbon coating layer is presented on surface of the second negative electrode active material.

In some preferred embodiments, the natural graphite constitutes ≥50% by mass of the first negative electrode active material, and more preferably from 80% to 100% by mass.

In some preferred embodiments, the artificial graphite constitutes ≥80% by mass of the second negative electrode active material, and more preferably from 90% to 100% by mass.

Both the natural graphite and the artificial graphite used in the present application can be obtained commercially.

In some preferred embodiments, the negative electrode film has a thickness of ≥50 μm, and preferably from 60 μm to 75 μm. It should be noted that, the thickness of the negative electrode film refers to the total thickness of the negative electrode film (that is, the sum of the thickness of the first negative electrode film and the thickness of the second negative electrode film).

In some preferred embodiments, an areal density CW of the negative electrode film satisfies: $10 \text{ mg/cm}^2 \leq CW \leq 13 \text{ mg/cm}^2$, preferably $10.5 \text{ mg/cm}^2 \leq CW \leq 11.5 \text{ mg/cm}^2$. It should be noted that the areal density of the negative electrode film refers to the total areal density of the negative electrode film (that is, the sum of the areal density of the first negative electrode film and the areal density of the second negative electrode film).

In some preferred embodiments, a thickness ratio of the first negative electrode film to the second negative electrode film is from 1:1.01 to 1:1.1, and more preferably from 1:1.02 to 1:1.06.

When the thickness ratio of the upper film to the lower film falls within the given range, it is beneficial to forming gradient pore distribution between the upper film and the lower film, the liquid-phase conduction resistance of the active ions deintercalated from the positive electrode on the surface of the negative electrode film is reduced, which will not lead to lithium precipitation on the surface of the negative electrode film caused by the accumulation of the active ions; meanwhile, the uniform diffusion of the active ions in the film is beneficial to reducing the polarization, thereby further improving the kinetic performance and cycle performance of the battery.

In some preferred embodiments, a specific surface area S of the negative electrode film satisfies: $1.8 \text{ m}^2/\text{g} \leq S \leq 2.6 \text{ m}^2/\text{g}$, more preferably $2.0 \text{ m}^2/\text{g} \leq S \leq 2.4 \text{ m}^2/\text{g}$. When the specific surface area of the negative electrode film falls within the given range, there are moderate electrochemical active sites in the negative electrode film, which can effectively reduce the side reactions in the battery so as to further improve the cycle performance of the battery.

In the present application, the resilience rate of the material under a certain action force has a well-known meaning in the art and can be measured using a method known in the art. For example, referring to GB/T 24533-2009, an electronic compression-testing machine (for example, UTM7305) may be used. As an example, the measurement may be carried out as follows:

1) Instrument calibration: put a gasket and a steel column into a mold, then pressurize to 15,000N and hold for 30 seconds, weigh it and then record the pressure holding height H0; release the pressure, and after 10 seconds, record the pressure depressurizing height H1.

2) Testing of resilience rate: weigh a certain amount (for example, about 0.9±0.01 g) of active material, record its weight M with a unit of g, put the weighed active material into the groove of the mold; use another steel gasket with a plane facing downward to press the active material powder; then use the steel column with a plane facing downward to press the gasket. Pressurize to 15,000N and hold for 30 seconds, record the pressure holding height H2. Release the pressure, and after 10 seconds, record the pressure depressurizing height H3. The resilience rate of the material=(H3−H2−H1+H0)/(H2−H0).

In the present application, Dv10, Dv50 and Dv90 of the materials all have a well-known meaning in the art and can be measured using a method known in the art. For example, they may be obtained by using a laser diffraction particle size distribution analyzer (for example, Mastersizer 3000) according to a particle size analysis-laser diffraction method (specifically may refer to GB/T 19077-2016). Dv10 is the particle size when the cumulative volume distribution percentage of the material reaches 10%; Dv50 is the particle size when the cumulative volume distribution percentage of the material reaches 50%, which is also known as the volume median particle size; Dv90 is the particle size when the cumulative volume distribution percentage of the material reaches 90%.

In the present application, the powder compaction density of the material has a well-known meaning in the art and can be measured using a method known in the art. For example, referring to GB/T 24533-2009, an electronic compression-testing machine (for example, UTM7305) is used to carry out the measurement: put a certain amount of powder on a special compaction mold, set different pressures, read the values of the thickness of the powder under different pressures from the instrument, and calculate the compaction density thereof under a certain pressure. In the present application, the pressure may be 50,000 N.

In the present application, the graphitization degree of the material has a well-known meaning in the art and can be measured using a method known in the art. For example, the graphitization degree can be measured by using an X-ray diffractometer (for example, Bruker D8 Discover), referring to JIS K 0131-1996 and JB/T 4220-2011, the value of $d_{002}$ is obtained, and then the graphitization degree can be calculated by the formula: the graphitization degree $G=(0.344-d_{002})/(0.344-0.3354)\times 100\%$, wherein $d_{002}$ refers to an interlayer spacing of the crystal structure of the material in nanometer (nm).

In the present application, the morphology of the material has a well-known meaning in the art and can be determined using a method known in the art. For example, the morphology of the material particle is determined by sticking the material onto a conductive adhesive and using a scanning electron microscope (for example, ZEISS Sigma 300). Specific measurement may refer to JY/T 010-1996.

In the present application, the total thickness of the negative electrode film may be measured by a 1/10 micrometer. For example, a 1/10 micrometer with a model number of Mitutoyo 293-100 and a precision of 0.1 μm, is used to carry out the measurement.

In the present application, the thickness of the first negative electrode film and the thickness of the second negative electrode film can be measured using a scanning electron microscope (for example, ZEISS sigma 300). The sample is prepared as follows: firstly, cut the negative electrode plate into a sample with a certain size (for example, 2 cm×2 cm), and fix the negative electrode plate onto a sample table by using paraffin; place and fix the sample table onto a sample holder; open the power supply of an argon cross-section polisher (for example, IB-19500CP), conduct a vacuuming operation (for example, vacuum to $10^{-4}$ Pa), set argon flow (for example, 0.15 MPa), voltage (for example, 8 KV) and polish time (for example, 2 hours), and then adjust the sample table to start polishing in a swing mode. The measurement of the sample may refer to JY/T 010-1996. To ensure the accuracy of the testing results, several different measuring areas (for example, 10) on the sample can be randomly selected to carry out the scanning measurement, the thickness of the first negative electrode film and the thickness of the second negative electrode film in the measuring area can be obtained by reading the value of the ruler and at a certain magnification (for example, a magnification of ×500), and the average value of the testing results obtained from the several different measuring areas is regarded as the thickness of the first negative electrode film and the thickness of the second negative electrode film.

In the present application, the areal density of the negative electrode film has a well-known meaning in the art and can be measured using a method known in the art. For example, cut the single-coated and cold-pressed negative electrode plate into a small wafer with an area of S1 (if the negative electrode plate is double-coated, the negative electrode film on one of the surface thereof can be wiped off), weigh and record the weight as M1; then wipe off the negative electrode film from the weighed negative electrode plate to obtain the negative electrode current collector, weigh and record the weight of the negative electrode current collector as M0; and the areal density of the negative electrode film=(the weight of the negative electrode plate M1−the weight of the negative electrode current collector M0)/S1. To ensure the accuracy of the testing results, several different groups (for example, 10 groups) of samples can be measured, and the average value thereof is calculated as the testing result.

In the present application, the specific surface area of the negative electrode film has a well-known meaning in the art, and may be measured using a method known in the art. For example, referring to GB/T 19587-2017, the specific surface area of the negative electrode film may be measured with analysis of the specific surface area by nitrogen adsorption and calculated by a BET (Brunauer Emmett Teller) method, in which the analysis of the specific surface area by nitrogen adsorption may be carried out with a specific surface and pore size analyzer (Tri-Star 3020) from Micromeritics, USA.

The pressed density of the negative electrode film has a well-known meaning in the art and can be measured using a method known in the art. For example, the areal density and the thickness of the negative electrode film can be obtained according to the aforementioned methods, and the pressed density of the negative electrode film=the areal density of the negative electrode film/the thickness of the negative electrode film.

It should be noted that, the testing of the above parameters of the negative electrode active material can be carried out by using a sample which is taken before the coating process, or using a sample which is taken from the cold-pressed negative electrode film.

When the sample is taken from the cold-pressed negative electrode film, as an example, the measurement can be carried out as follows:

(1) firstly, randomly select a cold-pressed negative electrode film to take the sample of the second negative electrode active material (for example, the sample may be taken by scraping via a blade), and the scraping depth is no deep than the boundary zone between the first negative electrode film and the second negative electrode film;

(2) secondly, take the sample of the first negative electrode active material, since there may be an inter-melting layer at the boundary zone between the first negative electrode film and the second negative electrode film during the cold pressing process of the negative electrode film (that is, there are both the first negative electrode active material and the second negative electrode active material existing in the inter-melting layer), in order to ensure the accuracy of the measurement, when the sample of the first negative electrode active material is taken, the inter-melting layer may be scraped first, and then the sample of the first negative electrode active material can be taken by scraping;

(3) respectively put the collected first negative electrode active material and the collected second negative electrode active material into deionized water, which is followed by filtering and drying, and then the dried first and second negative electrode active material are respectively sintered at a certain temperature and for a certain time (for example, 400° C., 2 hours) so as to remove the binder and the conductive carbon, finally the sample of the first negative electrode active material and the sample of the second negative electrode active material are obtained.

During the sampling process, the position of the boundary zone between the first negative electrode film and the second negative electrode film can be determined with the help of an optical microscope or a scanning electron microscope.

In the present application, the first negative electrode film and/or the second negative electrode film generally comprise a negative electrode active material as well as an optional binder, an optional conductive agent and other optional additives.

As an example, the conductive agent may be one or more of superconducting carbon, acetylene black, carbon black, Ketjen black, carbon dots, carbon nanotubes, grapheme, and carbon nanofibers.

As an example, the binder may be one or more of styrene-butadiene rubber (SBR), water-based acrylic resin, polyvinylidene fluoride (PVDF), polytetrafluoroethylene (PTFE), ethylene-vinyl acetate copolymer (EVA), polyvinyl alcohol (PVA), and polyvinyl butyral (PVB).

As an example, other optional additives may be a thickening and dispersing agent (for example, sodium carboxymethyl cellulose, CMC-Na), a PTC thermistor material and the like.

In the present application, in addition to the aforementioned graphite, the first negative electrode active material and/or the second negative electrode active material of the present application may optionally comprise a certain amount of other conventionally used negative electrode active material, such as one or more of soft carbon, hard carbon, silicon-based material, tin-based material and lithium titanate. The silicon-based material may be selected from one or more of elemental silicon, silicon oxide, silicon carbon composite and silicon alloy. The tin-based material may be selected from one or more of elemental tin, tin oxide compound and tin alloy. These materials are commercially available. A person of ordinary skill in the art can make appropriate select according to actual application environment.

In the secondary battery of the present application, the negative electrode current collector may be a conventional metal foil or a composite current collector (for example, a metal material may be disposed on a polymer substrate to form the composite current collector). As an example, the negative electrode current collector may be a copper foil.

It should be understood that, the negative electrode current collector has two opposite surfaces on its thickness direction, and the negative electrode film may be laminated and disposed on either or both of the two opposite surfaces of the negative electrode current collector.

Figure 2:
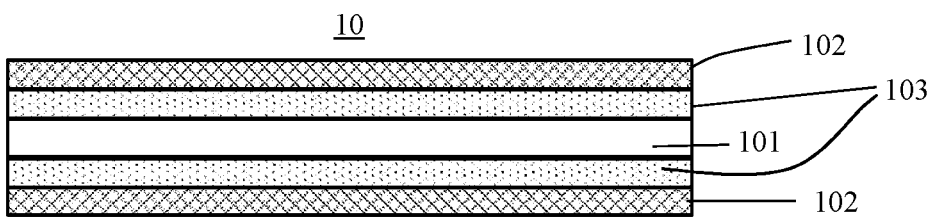
FIG. 2 is a schematic diagram of a negative electrode plate of a secondary battery provided by an embodiment of the present application.

FIG. 2 is a schematic diagram of a negative electrode plate 10 provided by an embodiment of the present application. The negative electrode plate 10 is composed of a negative electrode current collector 101, two first negative electrode films 103 respectively disposed on both surfaces of the negative electrode current collector, and two second negative electrode films 102 respectively disposed on the two first negative electrode films 103.

Figure 3:
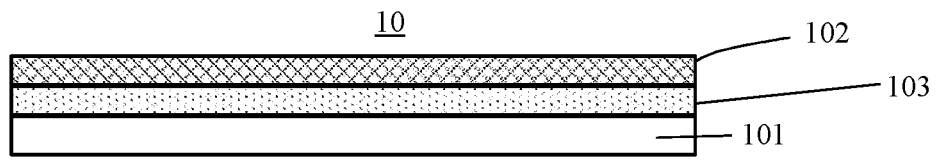
FIG. 3 is a schematic diagram of a negative electrode plate of a secondary battery provided by another embodiment of the present application.

FIG. 3 is a schematic diagram of a negative electrode plate 10 provided by another embodiment of the present application. The negative electrode plate 10 is composed of a negative electrode current collector 101, a first negative electrode film 103 disposed on one of the two opposite surfaces of the negative electrode current collector, and a second negative electrode film 102 disposed on the first negative electrode film 103.

It should be noted that, the given parameters of the negative electrode film (for example, thickness, areal density, etc.) in the present application all refer to the parameters of either one negative electrode film. When the negative electrode film is disposed on both surfaces of the negative electrode current collector, as long as the parameters of the negative electrode film disposed on either surface of the negative electrode current collector satisfies the present application, which is considered to fall within the protection scope of the present application. The ranges of the thickness, the areal density and the like in the present application all refer to the parameters of the negative electrode film which is already cold-pressed and used to assemble a battery.

[Positive Electrode Plate]

In the secondary battery of the present application, the positive electrode plate comprises a positive electrode current collector and a positive electrode film disposed on at least one surface of the positive electrode current collector, and the positive electrode film comprises a positive electrode active material.

It should be understood that, the positive electrode current collector has two opposite surfaces on its thickness direction, and the positive electrode film may be laminated and disposed on either or both of the two opposite surfaces of the positive electrode current collector.

In the secondary battery of the present application, the positive electrode current collector may be a conventional metal foil or a composite current collector (for example, a metal material may be disposed on a polymer substrate to form a composite current collector). As an example, the positive electrode current collector may be an aluminum foil.

In the secondary battery of the present application, the positive electrode active material may comprise one or more of lithium transition metal oxides, lithium-containing phosphates with olivine structure and respective modified compounds thereof. Examples of lithium transition metal oxides may include, but be not limited to, one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and respective modified compounds thereof. Examples of lithium-containing phosphates with olivine structure may include, but not be limited to, one or more of lithium ferrous phosphate, composite material of lithium ferrous phosphate and carbon, lithium manganese phosphate, composite material of lithium manganese phosphate and carbon, lithium ferrous manganese phosphate, composite material of lithium ferrous manganese phosphate with carbon and respective modified compounds thereof. The present application is not limited to these materials, and other conventionally known materials that can be used as a positive electrode active material of the secondary battery may also be used.

In some preferred embodiments, the positive electrode active material may comprise one or more of lithium transition metal oxides as shown in Formula 1 and modified compounds thereof so as to further increase the energy density of the battery.

$$Li_aNi_bCo_cM_dO_eA_f \quad \text{Formula 1}$$

In Formula 1, 0.8≤a≤1.2, 0.5≤b<1, 0<c<1, 0<d<1, 1≤e≤2, 0≤f≤1. M is selected from one or more of Mn, Al, Zr, Zn, Cu, Cr, Mg, Fe, V, Ti and B, and A is selected from one or more of N, F, S and Cl.

In the present application, the modified compounds of the aforementioned materials may be doping-modified and/or coating-modified materials.

In the secondary battery of the present application, the positive electrode film also optionally comprises a binder and/or a conductive agent.

As an example, the binder for the positive electrode film may comprise one or more of polyvinylidene fluoride (PVDF) and polytetrafluoroethylene (PTFE).

As an example, the conductive agent for the positive electrode film may comprise one or more of superconducting carbon, acetylene black, carbon black, Ketjen black, carbon dots, carbon nanotubes, graphene, and carbon nanofibers.

[Electrolyte]

The electrolyte conducts ions between the positive electrode plate and the negative electrode plate. There is no specific limitation on the type of the electrolyte in the present application, and it can be selected according to actual needs. For example, the electrolyte may be selected from at least one of a solid electrolyte and a liquid electrolyte (i.e., an electrolytic solution).

In some embodiments, an electrolytic solution is used as the electrolyte. The electrolytic solution comprises an electrolyte salt and a solvent.

In some embodiments, the electrolyte salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS) and diethylsulfone (ESE).

In some embodiments, the electrolytic solution may optionally comprise an additive. For example, the additive may comprise a negative electrode film-forming additive, a positive electrode film-forming additive, and additives capable of improving certain performance of the battery, such as an additive that improves overcharge performance of the battery, an additive that improves high-temperature performance of the battery, and an additive that improves low-temperature performance of the battery.

[Separator]

In the secondary batteries that use the electrolytic solution and some of the secondary batteries that use the solid electrolyte, a separator is also included. The separator is disposed between the positive electrode plate and the negative electrode plate to play a role of isolation. There is no specific limitation on the type of the separator, and any well-known porous separator having good electrochemical and mechanical stability can be selected. In some embodiments, the material of the separator may be selected from one or more of glass fiber, non-woven fabric, polyethylene, polypropylene and polyvinylidene fluoride. The separator may be a single-layer film or a multilayer composite film. When the separator is a multilayer composite film, the materials of each layer may be the same or different.

In some embodiments, the positive electrode plate, the negative electrode plate and the separator may be wound or laminated to form an electrode assembly.

In some embodiments, the secondary battery may comprise an outer package. The outer package may be used to encapsulate the electrode assembly and the electrolyte.

In some embodiments, the outer package of the secondary battery may be a hard case, such as a hard plastic case, an aluminum case and a steel case. The outer package of the secondary battery may also be a soft bag, such as a bag-type soft bag. The soft bag may be made from plastic, such as polypropylene (PP), polybutylene terephthalate (PBT), polybutylene succinate (PBS) or combination thereof.

There is no specific limitation on the shape of the secondary battery in the present application, which may be cylindrical, square or any other suitable shape. For example, FIG. 1 is a secondary battery 5 in the shape of a square as an example.

Figure 4:
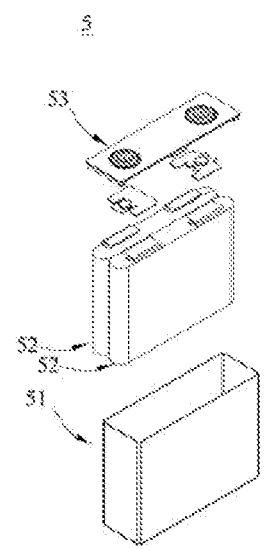
FIG. 4 is an exploded view of a secondary battery provided by an embodiment of the present application.

In some embodiments, referring to FIG. 4, the outer package may comprise a case 51 and a cover plate 53. The case 51 may comprise a bottom plate and a side plate connecting to the bottom plate, the bottom plate and the side plate are enclosed to form an accommodating cavity. The case 51 has an opening communicating with the accommodating cavity, and the cover plate 53 may cover the opening so as to close the accommodating cavity. The positive electrode plate, the negative electrode plate and the separator may be wound or laminated to form an electrode assembly 52. The electrode assembly 52 is encapsulated in the accommodating cavity. The electrolyte solution infiltrates the electrode assembly 52. The number of the electrode assemblies 52 included in the secondary battery 5 may be one or more, and may be adjusted according to different needs.

In some embodiments, the secondary battery can be further assembled into a battery module, a plurality of secondary batteries can be included in the battery module, and the specific number of the secondary batteries can be adjusted according to the application and desirable capacity of the battery module.

Figure 5:
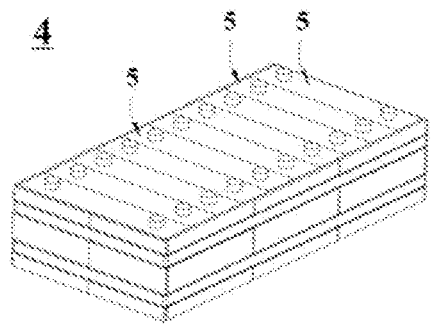
FIG. 5 is a schematic diagram of an embodiment of a battery module.

FIG. 5 is a battery module 4 as an example. Referring to FIG. 5, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed using fasteners.

Optionally, the battery module 4 may comprise a housing with a receiving space, and the plurality of secondary batteries 5 are received in the receiving space.

In some embodiments, the above-mentioned battery module may further be assembled into a battery pack, and the number of the battery modules included in the battery pack can be adjusted according to the application and desirable capacity of the battery pack.

Figure 6:
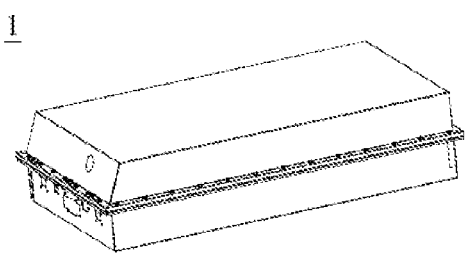
FIG. 6 is a schematic diagram of an embodiment of a battery pack.
Figure 7:
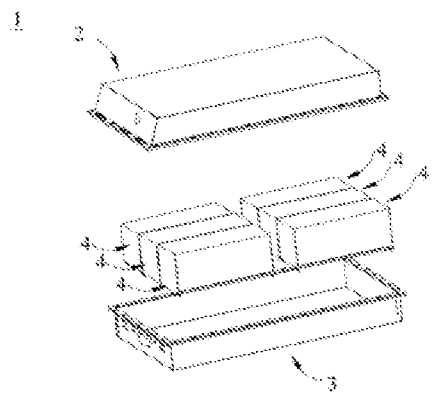
FIG. 7 is an exploded view of FIG. 6.

FIGS. 6 and 7 are a battery pack 1 as an example. Referring to FIGS. 6 and 7, the battery pack 1 may comprise a battery case and a plurality of battery modules 4 disposed in the battery case. The battery case comprises an upper case body 2 and a lower case body 3, the upper case body 2 can cover the lower case body 3 to form a closed space for receiving the plurality of battery modules 4. The plurality of battery modules 4 can be disposed in the battery case in any manner.

Method for Manufacturing Secondary Battery

In a second aspect of the present application, there is provided a method for manufacturing a secondary battery, which comprises the following steps to prepare the negative electrode plate of the secondary battery:

1) forming, on at least one surface of the negative electrode current collector, a first negative electrode film that comprises a first negative electrode active material, the first negative electrode active material comprises natural graphite and satisfies: $12\% \leq A \leq 18\%$;

2) forming, on the first negative electrode film, a second negative electrode film that comprises a second negative electrode active material, the second negative electrode active material comprises artificial graphite and satisfies: $20\% \leq B \leq 30\%$;

wherein A is a resilience rate of the first negative electrode active material measured under an action force of 15,000 N, and B is a resilience rate of the second negative electrode active material measured under an action force of 15,000 N.

In the preparation method of the secondary battery of the present application, the slurry of the first negative electrode active material and the slurry of the second negative electrode active material may be coated simultaneously, and may also be coated in order.

In some preferred embodiments, the slurry of the first negative electrode active material and the slurry of the second negative electrode active material are coated simultaneously. One-time simultaneous coating can make the bonding property between the upper negative electrode film and the lower negative electrode film better, and help to further improve the cycle performance of the battery.

In addition to the preparation method of the negative electrode plate, the construction and preparation method of the secondary battery of the present application are well-known in the art.

As an example, the construction and preparation method of the secondary battery of the present application may be as follows.

In addition to the preparation method of the negative electrode plate of the present application, other construction and preparation methods of the secondary battery of the present application are well-known in the art. For example, the positive electrode plate of the present application may be prepared as follows: the positive electrode active material and an optional conductive agent (for example, carbon materials, like carbon black), an optional binder (for example, PVDF) and the like are mixed and dispersed in a solvent (for example, NMP), and after uniformly stirring, the mixture is uniformly coated on a positive electrode current collector, which is then dried to obtain the positive electrode plate. As the positive electrode current collector, a material for example a metal foil, such as an aluminum foil, or a porous metal plate can be used. In the preparation process of the positive electrode plate, a positive lead position may be disposed on the no-coating area of the positive electrode current collector by the method of punching or laser die-cutting.

Finally, the positive electrode plate, the separator and the negative electrode plate are stacked in order, so that the separator is positioned between the positive electrode plate and the negative electrode plate to play a role of isolation, and then wound (or laminated) to obtain an electrode assembly; and then the electrode assembly is put into an outer package and dried; then the electrolyte solution is injected after vacuum encapsulation, standing, formation, shaping, and the like, a secondary battery is obtained.

Apparatus

In a third aspect of the present application, there is provided an apparatus. The apparatus comprises the secondary battery according to the first aspect of the present application or the secondary battery that is manufactured by means of the method according to the second aspect of the present application. The secondary battery can be used as a power supply of the apparatus or as an energy storage unit of the apparatus. The apparatus of the present application uses the secondary battery provided in the present application and thus has at least the same advantages as the aforementioned secondary battery.

The apparatus may be, but is not limited to, a mobile device (e.g., a mobile phone, a laptop computer), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the secondary battery, the battery module or the battery pack, depending on its practical requirements.

Figure 8:
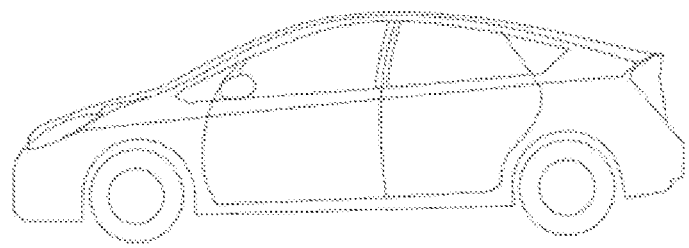
FIG. 8 is a schematic diagram of an apparatus where a secondary battery provided by an embodiment of the present application is used as a power supply.

FIG. 8 is an apparatus as an example. The apparatus is a pure electric vehicle, a hybrid electric vehicle, or a plug-in hybrid electric vehicle. In order to meet the requirements of the apparatus for high power and high energy density of the secondary batteries, the battery pack or the battery module can be used.

As another example, the apparatus may be a mobile phone, a tablet computer, a laptop, etc. The apparatus is generally required to be thin and light, and the secondary battery can be used as a power supply.

The beneficial effects of the present application are further described with reference to the examples below.

EXAMPLE

In order to make the objects, the technical solutions and the beneficial technical effects of the present application more clear, the present application will be further described in details with reference to the examples below. However, it should be understood that the examples of the present application are only intended to explain the present application and are not intended to limit the present application, and the examples of the present application are not limited to the examples set forth herein. The experimental conditions or operating conditions not specified in the examples are prepared according to conventional conditions, or the conditions recommended by the material supplier.

I. Preparation of Secondary Battery

Example 1

1) Preparation of Positive Electrode Plate $LiNi_{0.8}Co_{0.1}Mn_{0.1}O_2$ (NCM811), conductive carbon black (Super-P) and polyvinylidene fluoride (PVDF) as a binder at a mass ratio of 94:3:3 were sufficiently stirred and mixed in N-methyl pyrrolidone as a solvent to obtain a uniform slurry, the slurry was coated on aluminum foil, which was then followed by drying, cold pressing, slitting and cutting, then a positive electrode plate was obtained. An areal density of the positive electrode film was 17.5 mg/cm$^2$ and a pressed density of the positive electrode film was 3.4 g/cm$^3$.

2) Preparation of Negative Electrode Plate

Firstly, preparation of negative slurry 1: natural graphite as a first negative electrode active material, SBR as a binder, carboxymethyl cellulose sodium (CMC-Na) as a thickener and conductive carbon black (Super P) were weighed at a mass ratio of 96.2:1.8:1.2:0.8, which was then added into a stirring tank together with deionized water in a certain order to obtain a negative electrode slurry 1.

Secondly, preparation of negative slurry 2: artificial graphite as a second negative electrode active material, SBR as a binder, carboxymethyl cellulose sodium (CMC-Na) as a thickener and conductive carbon black (Super P) were weighed at a mass ratio of 96.2:1.8:1.2:0.8, which was then added into a stirring tank together with deionized water in a certain order to obtain a negative electrode slurry 2.

Thirdly, the negative electrode slurry 1 and the negative electrode slurry 2 were extruded simultaneously through a double-cavity coating apparatus. The negative electrode slurry 1 was coated on the negative electrode current collector to form a first negative electrode film, and the negative electrode slurry 2 was coated on the first negative electrode film to form a second negative electrode film; a mass ratio of the first negative electrode film to the second negative electrode film was 1:1; an areal density of the negative electrode film was 11.5 mg/cm$^2$; and a pressed density of the negative electrode film was 1.65 g/cm$^3$.

The fourth, the above-prepared wet film was baked under different temperature zones through an oven to obtain a dried electrode plate, then the dried electrode plate was cold pressed to obtain the needed negative electrode film, which was then followed by slitting and cutting, finally a negative electrode plate was obtained.

3) Separator

PE film was used as the separator.

4) Preparation of Electrolyte Solution

Ethylene carbonate (EC), methyl ethyl carbonate (EMC) and diethyl carbonate (DEC) were mixed at a volume ratio of 1:1:1, and then sufficiently dried $LiPF_6$ as a lithium salt was dissolved in the thus-obtained organic solvent to obtain the electrolyte solution, in which the concentration of $LiPF_6$ was 1 mol/L.

5) Preparation of Battery

The positive electrode plate, the separator and the negative electrode plate were stacked in order and then wound to obtain an electrode assembly, the electrode assembly was put into the outer package, then the above-described electrolyte solution was injected, and after encapsulation, standing, formation and aging, a secondary battery was obtained.

The preparation methods of the secondary batteries in Examples 2-12 (Ex. 2-12) and Comparative Examples 1-4 (CE. 1-4) were similar to those of Example 1, but the compositions and the product parameters of the electrode plate of the battery were adjusted, and the different product parameters were shown in Table 1 in details.

II. Testing Method of Performance

1) Testing of Kinetic Performance (Lithium Precipitation Rate at Room Temperature)

At 25° C., the charging and discharging process of the battery of each of the examples and comparative examples was carried out as follows. The battery was discharged at a constant current of 1.0 C (which equaled to the value of the current where the theoretical capacity was fully discharged within 1 hour) to 2.8 V (discharging cut-off voltage). Then the battery was charged at a constant current of 1.0 C to 4.2 V (charging cut-off voltage), and then charged at a constant voltage to 0.05 C, at this time the battery was fully charged. The fully charged battery was kept standing for 5 minutes, and then discharged at constant current of 1.0 C to the discharging cut-off voltage, and the discharge capacity at this time was the actual capacity at 1.0 C of the battery, which was recorded as C0. After that, the battery was charged at a constant current of x C0 to the upper limit of the cut-off voltage, and then charged at a constant voltage to 0.05 C0 and kept standing for 5 minutes; afterwards, the battery was disassembled to observe the lithium precipitation at the interface. If there was no lithium precipitation on the surface of the negative electrode plate, the charging rate was increased and the testing process was repeated, until there was lithium precipitation on the surface of the negative electrode plate. The maximum charging rate of the battery when there was no lithium precipitation on the surface of the negative electrode plate was recorded to characterize the kinetic performance of the battery.

2) Testing of High-Temperature Storage Performance

At 25° C., the charging and discharging process of the battery of each of the examples and comparative examples was carried out as follows. The battery was discharged at a constant current of 1.0 C (which equaled to the value of the current where the theoretical capacity was fully discharged within 1 hour) to 2.8 V (discharging cut-off voltage). Then the battery was charged at a constant current of 1.0 C to 4.2 V (charging cut-off voltage), and then charged at a constant voltage to 0.05 C, at this time the battery was fully charged. The fully charged battery was kept standing for 5 minutes, and then discharged at constant current of 1.0 C to the discharging cut-off voltage, and the discharge capacity at this time was the actual capacity at 1.0 C of the battery, which was recorded as C0. Then at 25° C., the battery was charged at a constant current of 1 C0 to the charging cut-off voltage, and then charged at a constant voltage to 0.05 C, at this time the battery was fully charged. The fully charged battery was placed at 60° C., and after 30 days the battery was taken out to measure the remaining capacity which was recorded as C1 at 25° C., this was a storage cycle, and the discharging capacity at this time was the discharging capacity after the first storage cycle. The first storage cycle was repeated, until the discharging capacity was attenuated to 90% of C0, and the storage days at this time was recorded.

III. Testing Results of Examples and Comparative Examples

The battery of each of the examples and comparative examples was prepared, the performance parameters thereof were then measured according to the above-mentioned method, and the testing results were shown in Table 1.

It could be seen from the data of Examples 1-12 and Comparative Examples 1-4 shown in Table 1, only when the natural graphite in the first negative electrode active material satisfied 12%≤A≤18% and the artificial graphite in the second negative electrode active material satisfied 20%≤B≤30%, the secondary batteries could have both better kinetic performance and better high-temperature storage performance. When the natural graphite in the first negative electrode active material satisfied 13%≤A≤16% and/or the artificial graphite in the second negative electrode active material satisfied 24%≤B≤28%, the comprehensive performance of the secondary battery could be optimal. And when a ratio of B to A satisfied 1.1≤B/A≤2.5, and in particular 1.5≤B/A≤2.1, the performance of the secondary battery could be even better.

Some exemplary embodiments of the present application are provided as follows.

Embodiment 1. A secondary battery, comprising a negative electrode plate that comprises a negative electrode current collector and a negative electrode film, the negative electrode film comprising a first negative electrode film and a second negative electrode film, the first negative electrode film being disposed on at least one surface of the negative electrode current collector and comprising a first negative electrode active material, and the second negative electrode film being disposed on the first negative electrode film and comprising a second negative electrode active material; wherein the first negative electrode active material comprises natural graphite and satisfies: 12%≤A≤18%, the second negative electrode active material comprises artificial graphite and satisfies: 20%≤B≤30%, A is a resilience rate of the first negative electrode active material measured under an action force of 15,000 N, and B is a resilience rate of the second negative electrode active material measured under an action force of 15,000 N.

Embodiment 2. The secondary battery according to Embodiment 1, wherein 13%≤A≤16%; and/or, 24%≤B≤28%.

Embodiment 3. The secondary battery according to any one of Embodiments 1-2, wherein 1.1≤B/A≤2.5; preferably, 1.5≤B/A≤2.1.

Embodiment 4. The secondary battery according to any one of Embodiments 1-3, wherein the first negative electrode active material has a particle size distribution (Dv90−Dv10)/Dv50 of less than the second negative electrode active material.

Embodiment 5. The secondary battery according to any one of Embodiments 1-4, wherein the first negative electrode active material has a volume average particle size Dv50 of greater than the second negative electrode active material.

Embodiment 6. The secondary battery according to any one of Embodiments 1-5, wherein the first negative electrode active material further satisfies one or more of the following (1)-(6):

(1) the first negative electrode active material has a volume average particle size Dv10 of from 8 μm to 12 μm, preferably from 9 μm to 11 μm;

(2) the first negative electrode active material has a volume average particle size Dv50 of from 15 μm to 19 μm, preferably from 16 μm to 18 μm;

(3) the first negative electrode active material has a particle size distribution of 1.0≤(Dv90−Dv10)/Dv50≤1.5, preferably, 1.0≤(Dv90−Dv10)/Dv50≤1.3;

(4) the first negative electrode active material has a graphitization degree of from 95% to 98%, preferably from 96% to 97%;

(5) a morphology of the first negative electrode active material comprises one or more of sphere and spheroid; and (6) an amorphous carbon coating layer is presented on at least part of surface of the first negative electrode active material.

Embodiment 7. The secondary battery according to any one of Embodiments 1-6, wherein the second negative electrode active material further satisfies one or more of the following (1)-(6):

(1) the second negative electrode active material has a volume average particle size Dv10 of from 6 μm to 10 μm, preferably from 7 μm to 9 μm;

(2) the second negative electrode active material has a volume average particle size Dv50 of from 14 μm to 18 μm, preferably from 15 μm to 17 μm;

(3) the second negative electrode active material has a particle size distribution of 1.0≤(Dv90−Dv10)/Dv50≤2, preferably, 1.2≤(Dv90−Dv10)/Dv50≤1.7;

(4) the second negative electrode active material has a graphitization degree of from 90% to 95%, preferably from 91% to 93%;

(5) a morphology of the second negative electrode active material comprises one or more of block and flake; and (6) no amorphous carbon coating layer is presented on surface of the second negative electrode active material.

Embodiment 8. The secondary battery according to any one of Embodiments 1-7, wherein the natural graphite constitutes ≥50% by mass of the first negative electrode active material, preferably from 80% to 100% by mass; and/or, the artificial graphite constitutes ≥80% by mass of the second negative electrode active material, preferably from 90% to 100% by mass.

Embodiment 9. The secondary battery according to any one of Embodiments 1-8, wherein the secondary battery further satisfies one or more of the following (1)-(4):

(1) the negative electrode film has a thickness of ≥60 μm, preferably from 65 μm to 80 μm;

(2) a thickness ratio of the first negative electrode film to the second negative electrode film is from 1:1.01 to 1:1.1, preferably from 1:1.02 to 1:1.06;

(3) an areal density CW of the negative electrode film satisfies: 10 mg/cm²≤CW≤13 mg/cm², preferably 10.5 mg/cm²≤CW≤11.5 mg/cm²;

(4) a specific surface area S of the negative electrode film satisfies: 1.8 m²/g≤S≤2.6 m²/g, preferably 2.0 m²/g≤S≤2.4 m²/g.

Embodiment 10. The secondary battery according to any one of Embodiments 1-9, wherein the secondary battery comprises a positive electrode plate; the positive electrode plate comprises a positive electrode current collector and a positive electrode film, the positive electrode film is disposed on at least one surface of the positive electrode current collector and comprises a positive electrode active material, and the positive electrode active material comprises one or more of lithium transition metal oxides, lithium-containing phosphates with olivine structure and respective modified compounds thereof; preferably, the positive electrode active material comprises one or more of lithium transition metal oxides as shown in Formula 1 and modified compounds thereof, in the Formula 1, 0.8≤a≤1.2, 0.5≤b<1, 0<c<1, 0<d<1, 1≤e≤2, and 0≤f≤1, wherein M is selected from one or more of Mn, Al, Zr, Zn, Cu, Cr, Mg, Fe, V, Ti and B, and A is selected from one or more of N, F, S and Cl.

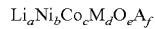 Formula 1

Embodiment 11. A method for manufacturing a secondary battery, comprising the following steps to prepare a negative electrode plate of the secondary battery:

1) forming, on at least one surface of the negative electrode current collector, a first negative electrode film that comprises a first negative electrode active material, wherein the first negative electrode active material comprises natural graphite and satisfies: 12%≤A≤18%; and 2) forming, on the first negative electrode film, a second negative electrode film that comprises a second negative electrode active material, wherein the second negative electrode active material comprises artificial graphite and satisfies: 20%≤B≤30%;

wherein A is a resilience rate of the first negative electrode active material measured under an action force of 15,000 N, and B is a resilience rate of the second negative electrode active material measured under an action force of 15,000 N.

Embodiment 12. An apparatus, comprising the secondary battery according to any one of Embodiments 1-10 or the secondary battery that is manufactured by the method according to Embodiment 11.

It is also to be understood that the above-described embodiments may be appropriately modified and varied by those skilled in the art in light of the above disclosure. Therefore, the present application is not limited to the specific embodiments as disclosed and described above, and the modifications and variations of the present application are intended to fall within the scope of the appended claims. In addition, although some specifically defined terms are used in the specification, these terms are merely used for convenience of description and do not impose any limitation on the present application.

and B is a resilience rate of the second negative electrode active material measured under an action force of 15,000 N.

2. The secondary battery according to claim 1, wherein 13%≤A≤16%; and/or, 24%≤B≤28%.

3. The secondary battery according to claim 1, wherein 1.1≤B/A≤2.5; preferably, 1.5≤B/A≤2.1.

4. The secondary battery according to claim 1, wherein the first negative electrode active material has a particle size distribution (Dv90−Dv10)/Dv50 of less than the second negative electrode active material.

5. The secondary battery according to claim 1, wherein the first negative electrode active material has a volume average particle size Dv50 of greater than the second negative electrode active material.

6. The secondary battery according to claim 1, wherein the first negative electrode active material further satisfies one or more of the following (1)-(6):
  (1) the first negative electrode active material has a volume average particle size Dv10 of from 8 μm to 12 μm, preferably from 9 μm to 11 μm;
  (2) the first negative electrode active material has a volume average particle size Dv50 of from 15 μm to 19 μm, preferably from 16 μm to 18 μm;
  (3) the first negative electrode active material has a particle size distribution of 1.0≤(Dv90−Dv10)/Dv50≤1.5, preferably, 1.0≤(Dv90−Dv10)/Dv50≤1.3;
  (4) the first negative electrode active material has a graphitization degree of from 95% to 98%, preferably from 96% to 97%;

TABLE 1

| No. | First negative electrode active material | Resilience rate A of first negative electrode active material | Second negative electrode active material | Resilience rate B of second negative electrode active material | B/A | Lithium precipitation rate of negative electrode plate at room temperature | High-temperature storage life of battery (days) |
|---|---|---|---|---|---|---|---|
| Ex. 1 | Natural graphite | 12.2% | Artificial graphite | 26.3% | 2.16 | 2.0 C. | 310 |
| Ex. 2 | Natural graphite | 13.5% | Artificial graphite | 26.3% | 1.95 | 2.2 C. | 321 |
| Ex. 3 | Natural graphite | 14.8% | Artificial graphite | 26.3% | 1.78 | 2.6 C. | 332 |
| Ex. 4 | Natural graphite | 16.3% | Artificial graphite | 26.3% | 1.61 | 2.7 C. | 297 |
| Ex. 5 | Natural graphite | 17.6% | Artificial graphite | 26.3% | 1.49 | 2.7 C. | 255 |
| Ex. 6 | Natural graphite | 14.8% | Artificial graphite | 20.2% | 1.36 | 2.1 C. | 334 |
| Ex. 7 | Natural graphite | 14.8% | Artificial graphite | 23.0% | 1.55 | 2.3 C. | 321 |
| Ex. 8 | Natural graphite | 14.8% | Artificial graphite | 25.8% | 1.74 | 2.6 C | 315 |
| Ex. 9 | Natural graphite | 14.8% | Artificial graphite | 27.4% | 1.85 | 2.7 C. | 301 |
| Ex. 10 | Natural graphite | 14.8% | Artificial graphite | 29.8% | 2.01 | 2.8 C. | 289 |
| Ex. 11 | Natural graphite | 14.8% | Artificial graphite | 28.1% | 1.90 | 1.9 C. | 300 |
| Ex. 12 | Natural graphite | 14.8% | Artificial graphite | 22.6% | 1.53 | 2.3 C. | 263 |
| CE. 1 | Natural graphite | 9.8% | Artificial graphite | 26.3% | 2.68 | 0.7 C. | 212 |
| CE. 2 | Natural graphite | 25.2% | Artificial graphite | 26.3% | 1.04 | 1.3 C. | 203 |
| CE. 3 | Natural graphite | 14.8% | Artificial graphite | 12.1% | 0.82 | 1.1 C. | 232 |
| CE. 4 | Natural graphite | 14.8% | Artificial graphite | 38.5% | 2.60 | 1.6 C. | 208 |

What is claimed is:

1. A secondary battery, comprising a negative electrode plate that comprises a negative electrode current collector and a negative electrode film, the negative electrode film comprising a first negative electrode film and a second negative electrode film, the first negative electrode film being disposed on at least one surface of the negative electrode current collector and comprising a first negative electrode active material, and the second negative electrode film being disposed on the first negative electrode film and comprising a second negative electrode active material;
  wherein the first negative electrode active material comprises natural graphite and satisfies: 12%≤A≤18%,
  the second negative electrode active material comprises artificial graphite and satisfies: 20%≤B≤30%,
  A is a resilience rate of the first negative electrode active material measured under an action force of 15,000 N, (5) a morphology of the first negative electrode active material comprises one or more of sphere and spheroid; and
  (6) an amorphous carbon coating layer is presented on at least part of surface of the first negative electrode active material.

7. The secondary battery according to claim 1, wherein the second negative electrode active material further satisfies one or more of the following (1)-(6):
  (1) the second negative electrode active material has a volume average particle size Dv10 of from 6 μm to 10 μm, preferably from 7 μm to 9 μm;
  (2) the second negative electrode active material has a volume average particle size Dv50 of from 14 μm to 18 μm, preferably from 15 μm to 17 μm;

(3) the second negative electrode active material has a particle size distribution of 1.0≤(Dv90−Dv10)/Dv50≤2, preferably, 1.2≤(Dv90−Dv10)/Dv50≤1.7;

(4) the second negative electrode active material has a graphitization degree of from 90% to 95%, preferably from 91% to 93%;

(5) a morphology of the second negative electrode active material comprises one or more of block and flake; and (6) no amorphous carbon coating layer is presented on surface of the second negative electrode active material.

8. The secondary battery according to claim 1, wherein the natural graphite constitutes ≥50% by mass of the first negative electrode active material, preferably from 80% to 100% by mass; and/or, the artificial graphite constitutes ≥80% by mass of the second negative electrode active material, preferably from 90% to 100% by mass.

9. The secondary battery according to claim 1, wherein the secondary battery further satisfies one or more of the following (1)-(4):

(1) the negative electrode film has a thickness of ≥60 μm, preferably from 65 μm to 80 μm;

(2) a thickness ratio of the first negative electrode film to the second negative electrode film is from 1:1.01 to 1:1.1, preferably from 1:1.02 to 1:1.06;

(3) an areal density CW of the negative electrode film satisfies: 10 mg/cm² ≤CW≤13 mg/cm², preferably 10.5 mg/cm² ≤CW≤11.5 mg/cm²;

(4) a specific surface area S of the negative electrode film satisfies: 1.8 m²/g≤S≤2.6 m²/g, preferably 2.0 m²/g≤S≤2.4 m²/g.

10. The secondary battery according to claim 1, wherein the secondary battery comprises a positive electrode plate; the positive electrode plate comprises a positive electrode current collector and a positive electrode film, the positive electrode film is disposed on at least one surface of the positive electrode current collector and comprises a positive electrode active material, and the positive electrode active material comprises one or more of lithium transition metal oxides, lithium-containing phosphates with olivine structure and respective modified compounds thereof;

preferably, the positive electrode active material comprises one or more of lithium transition metal oxides as shown in Formula 1 and modified compounds thereof,

    Formula 1, in the Formula 1, 0.8≤a≤1.2, 0.5≤b<1, 0<c<1, 0<d<1, 1≤e≤2, and 0≤f≤1, wherein M is selected from one or more of Mn, Al, Zr, Zn, Cu, Cr, Mg, Fe, V, Ti and B, and A is selected from one or more of N, F, S and Cl.

11. A method for manufacturing a secondary battery, comprising the following steps to prepare a negative electrode plate of the secondary battery:

1) forming, on at least one surface of the negative electrode current collector, a first negative electrode film that comprises a first negative electrode active material, wherein the first negative electrode active material comprises natural graphite and satisfies: 12%≤A≤18%; and 2) forming, on the first negative electrode film, a second negative electrode film that comprises a second negative electrode active material, wherein the second negative electrode active material comprises artificial graphite and satisfies: 20%≤B≤30%;

wherein A is a resilience rate of the first negative electrode active material measured under an action force of 15,000 N, and B is a resilience rate of the second negative electrode active material measured under an action force of 15,000 N.

12. An apparatus, comprising the secondary battery according to claim 1.

* * * * *